US006857879B2

United States Patent
Sawada et al.

(10) Patent No.: US 6,857,879 B2
(45) Date of Patent: Feb. 22, 2005

(54) COUPLING DEVICE AND FOLDING ELECTRONIC APPARATUS USING THE SAME

(75) Inventors: Masaki Sawada, Osaka (JP); Tamotsu Yamamoto, Hyogo (JP); Katsuichi Minami, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 69 days.

(21) Appl. No.: 10/123,186

(22) Filed: Apr. 17, 2002

(65) Prior Publication Data

US 2002/0155740 A1 Oct. 24, 2002

(30) Foreign Application Priority Data

Apr. 18, 2001 (JP) ........................................ 2001-119271

(51) Int. Cl.[7] .............................................. H01R 39/00
(52) U.S. Cl. ......................................................... 439/31
(58) Field of Search .................... 16/340, 342; 361/681, 361/818; 439/31, 164

(56) References Cited

U.S. PATENT DOCUMENTS

| | | | | |
|---|---|---|---|---|
| 4,730,364 A | * | 3/1988 | Tat-Kee ...................... | 361/681 |
| 4,846,536 A | * | 7/1989 | Saitou et al. ............... | 361/682 |
| 5,041,818 A | * | 8/1991 | Liu ............................ | 361/681 |
| 5,075,929 A | * | 12/1991 | Chung ........................ | 16/342 |
| 5,500,982 A | * | 3/1996 | Hosoi ......................... | 16/297 |
| 5,566,048 A | * | 10/1996 | Esterberg et al. .......... | 361/681 |
| 6,481,057 B2 | * | 11/2002 | Lin ............................ | 16/340 |
| 6,568,034 B2 | * | 5/2003 | Cho ........................... | 16/337 |

FOREIGN PATENT DOCUMENTS

JP          11-030226          2/1999

* cited by examiner

*Primary Examiner*—Thanh-Tam Le
(74) *Attorney, Agent, or Firm*—Wenderoth, Lind & Ponack, L.L.P.

(57) ABSTRACT

A hinge mechanism includes flanges 23A, 23B, and a swivel mechanism includes swiveling shaft 25. Spring 26 energizes the swiveling mechanism. Resilient repulsion of spring 26 energizes the swiveling mechanism to swivel toward either end of a swivelable range from a neutral position.

20 Claims, 15 Drawing Sheets

COUPLING DEVICE AND FOLDING ELECTRONIC APPARATUS USING THE SAME

FIELD OF THE INVENTION

The present invention relates to a coupling device which connects two electronic apparatuses having functions relative to each other and allows the two apparatuses to be folded as well as to be swiveled, and it also relates to a folding electronic apparatus using the same coupling device.

BACKGROUND OF THE INVENTION

FIG. 17 is a perspective outline drawing of a folding hand-held electronic apparatus disclosed in Japanese Patent Application Non-Examined Publication No. H11-30226. A conventional coupling device shown in FIG. 17 comprises hinge mechanism 5 and swivel mechanism 6.

Hinge mechanism 5 connects first flat electronic apparatus 2 having display 1 to second flat electronic apparatus 4 having operating board 3 such that apparatus 2 and apparatus 4 can be folded.

Swivel mechanism 6 is disposed between first apparatus 2 and hinge mechanism 5 and allows a user to swivel first apparatus 2 arbitrarily. As shown in FIG. 18 and FIG. 19, the hand-held electronic apparatus can be folded in two ways, i.e., (1) display 1 of first apparatus 2 shows inside and faces closely to operating board 3 of apparatus 4, and (2) contrary to case (1), display 1 shows outside.

Swivel mechanism 6 includes cylinder 7 and cylinder 8 fitted to each other, and this fitting allows both of cylinders 7 and 8 to swivel, as shown in a sectional view of FIG. 20. First apparatus 2 is mounted to cylinder 7, and cylinder 8 is mounted to hinge mechanism 5. Spring 13 urges cylinder 7 against cylinder 8 in order to supply a predetermined frictional resistance to the swiveling of first apparatus 2.

FIG. 21A and FIG. 21B illustrate each end face, opposite to each other, of cylinder 7 and cylinder 8 respectively. Protrusion 9 and guide groove 10 regulate a swivelable range of first apparatus 2 from its front side to reverse side, i.e., turned over. Protrusion 12 and recess 14 hold first apparatus 2 at either end of the swivelable range by clicking apparatus 2 into place with pressure of spring 13.

However, in the hand-held electronic apparatus using the conventional coupling device discussed above, when first apparatus 2 and second apparatus 4 are in an open position as shown in FIG. 17, first apparatus 2 can be stopped at an intermediate place within the swivelable range. If a user carelessly folds the hand-held electronic apparatus when first apparatus 2 is held perpendicular to second apparatus 4, a corner of first apparatus 2 may damage second apparatus 4.

SUMMARY OF THE INVENTION

The present invention aims to provide a coupling device, which addresses the problem discussed above, of a folding electronic apparatus. The coupling device of the present invention connects a first electronic apparatus to a second electronic apparatus. Both of the apparatuses are included in a hand-held electronic apparatus.

The coupling device comprises the following elements:
(a) a hinge mechanism;
(b) a swivel mechanism; and
(c) a spring for energizing the swivel mechanism.

The spring is mounted to the swivel mechanism such that the spring has a strong restoring force when the first apparatus is at the middle in a swivelable range, and the restoring force decreases gradually as the first apparatus approaches either end of the swivelable range. Resilient repulsion of the spring energizes the swivel mechanism to swivel the first apparatus toward either end of the swivelable range. As a result, the first apparatus stops and stays still at an end of the swivelable range. When the first apparatus stays at the end of the range, the first apparatus is held in parallel with the second apparatus, therefore, the second apparatus is not damaged when the hand-held electronic apparatus is folded.

DETAILED DESCRIPTION OF EXEMPLARY EMBODIMENT

First Exemplary Embodiment

Figure 1:
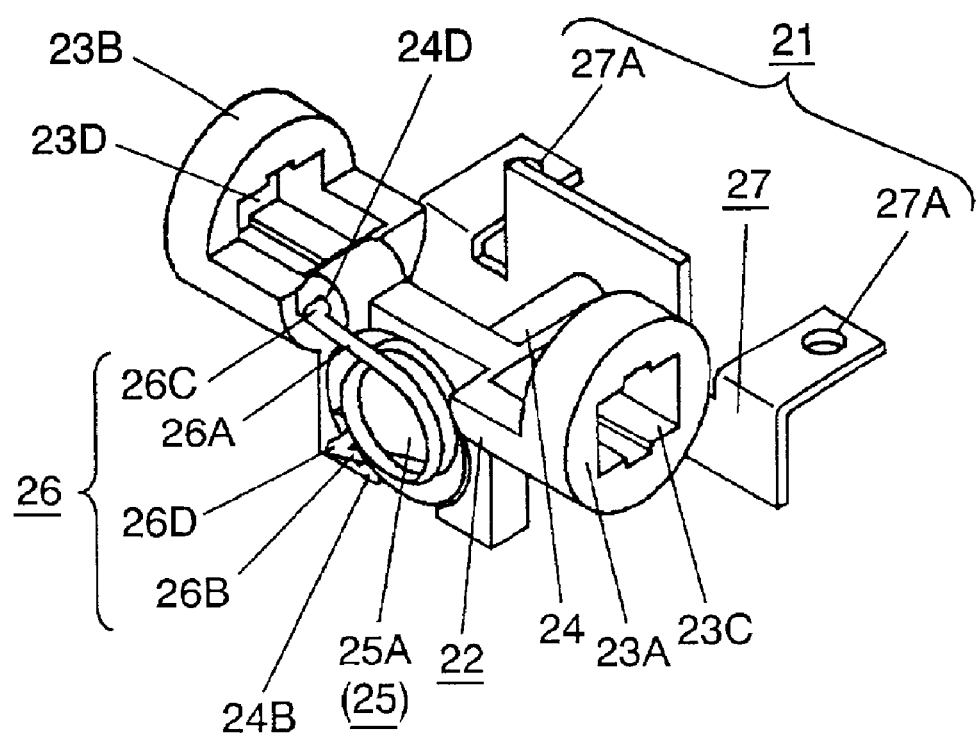
FIG. 1 is a perspective outline drawing of a coupling device in accordance with a first exemplary embodiment of the present invention.
Figure 2:
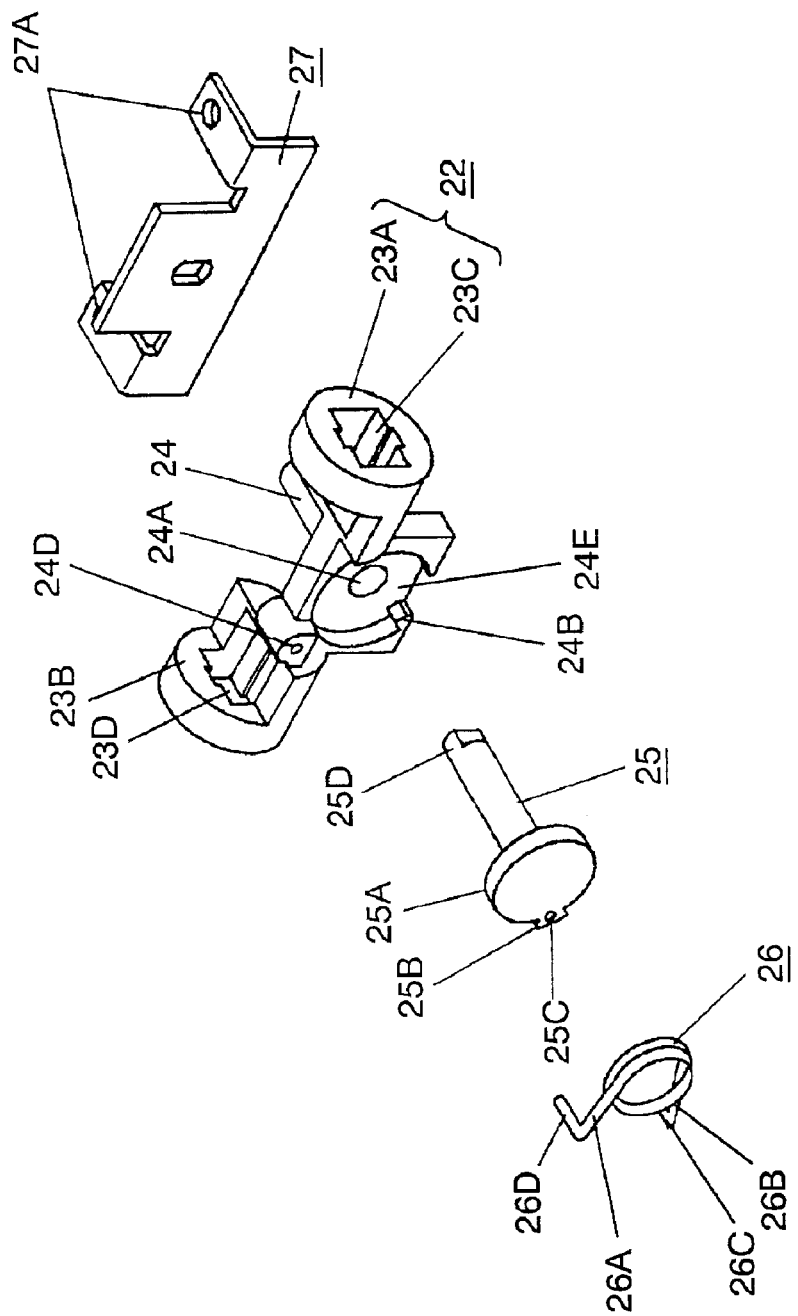
FIG. 2 shows a perspective exploded view of the coupling device in accordance with the first exemplary embodiment.

FIG. 1 is a perspective outline drawing of a coupling device in accordance with the first exemplary embodiment of the present invention, and FIG. 2 shows a perspective exploded view of the same coupling device. Main frame 22 of coupling device 21 includes flange 23A and flange 23B on its respective ends and cylinder 24 at a center of main frame 22. Flanges 23A, 23B have square holes respectively for receiving second electronic apparatus 31 (hereinafter called "second apparatus") described later. Cylinder 24 has a through hole 24A running perpendicular to an axis line extending from a center of square hole 23C to a center of square hole 23D.

Swiveling shaft 25 is fit in hole 24A in a swivelable way. Flange 25A disposed at a first end of shaft 25 has protrusion 25B on its rim. Two stoppers 24B, 24C (shown in FIG. 8A–FIG. 8C) are provided to circular recess 24E. Protrusion 25B and stoppers 24B, 24C regulate a swivelable range of shaft 25A to within 180°.

Small hole 25C is provided at a center of protrusion 25B, and small hole 24D is provided in main frame 22 outside a middle point between stoppers 24B and 24C.

Both ends 26D and 26C of torsion coil spring 26, torqued and made of resilient metallic wire such as piano-wire, are loosely fit in small holes 24D, 25C. Resilient repulsion of torqued spring 26 energizes shaft 25 so that swivel protrusion 25B can hit one of stoppers 24B or 24C.

A second end 25D of shaft 25 has a non-circular shape, and mounting bracket 27 made of a metal plate is fixed to end 25D for coupling first electronic apparatus 29 (hereinafter called "first apparatus") described later.

Figure 3:
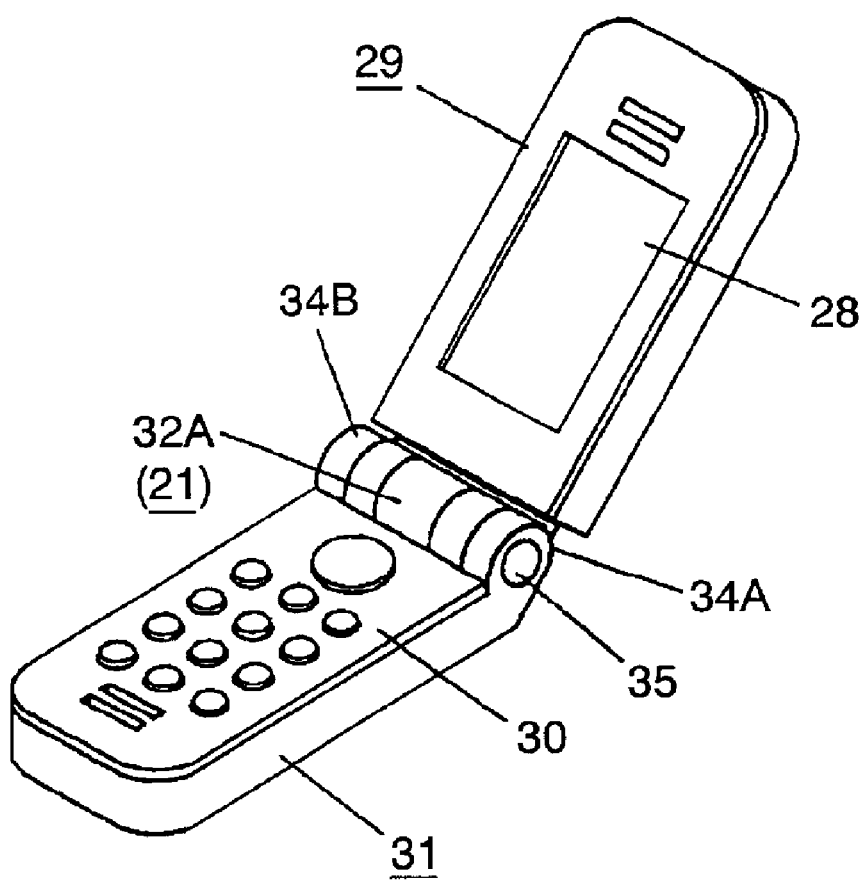
FIG. 3 is a perspective outline drawing of a folding cellular phone.
Figure 4:
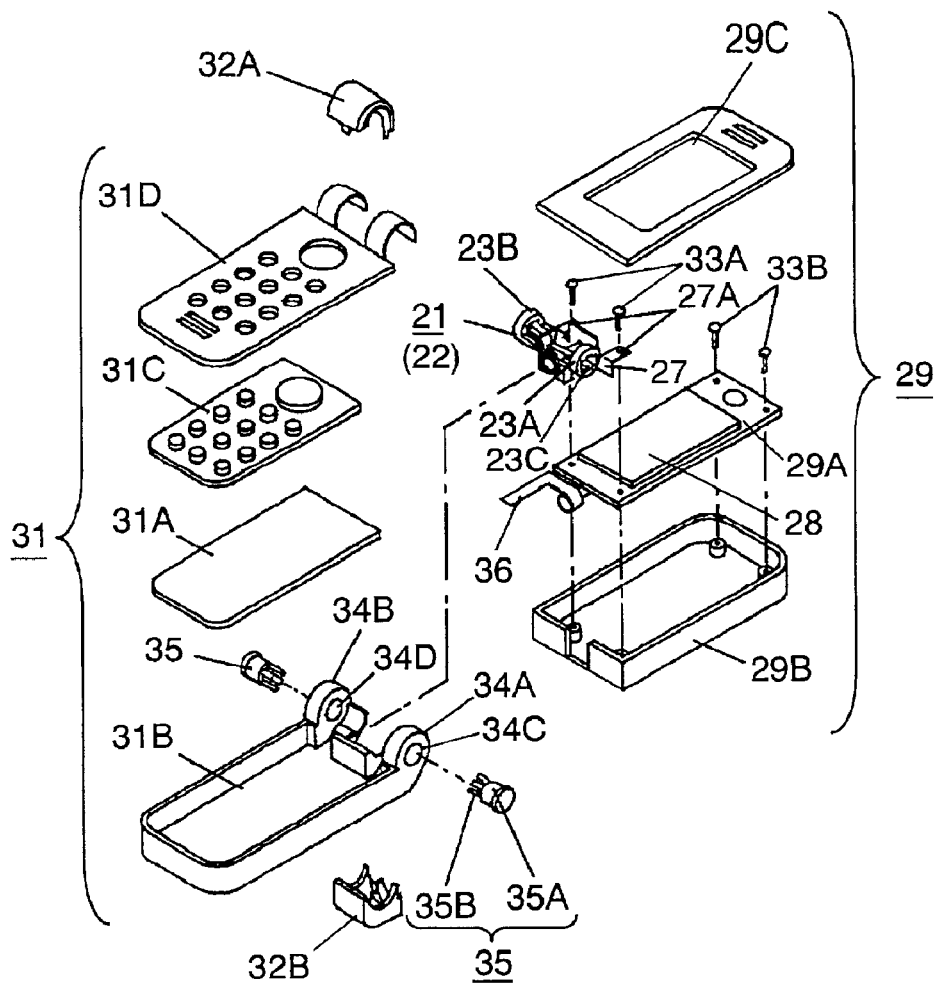
FIG. 4 shows a perspective exploded view of the folding cellular phone shown in FIG. 3.

FIG. 3 is a perspective outline drawing of a folding cellular phone using coupling device 21 in accordance with the first embodiment, and FIG. 4 shows a perspective exploded view illustrating how this folding cellular phone is assembled. The assembling method comprises the following steps.

(1) Couple board 29A of first apparatus 29 together with case 29B to mounting bracket 27 with screws 33A and 33B. Board 29A has display 28.

(2) Overlay cover plate 29C on board 29A, thereby completing first electronic apparatus 29. At the same time, first apparatus 29 is connected to coupling device 21 in a swivelable way.

(3) Sandwich main frame 22 with holders 34A, 34B provided at an end of case 31B of second apparatus 31, then align square holes 23C, 23D and round holes 34C, 34D, and press-fit pivot pin 35—35. Round root-section 36A of pivot pin 35 loosely fits in round holes 34C, 34D, and a divided square section at tip of pivot pin 35 is press-fitted and fixed in square holes 23C, 23D.

(4) Connect flexible wired board 36, which is led out from board 29A of first apparatus 29, to board 31A of second apparatus 31.

(5) Place board 31A into case 31B, and overlay key-board 31C to be used for keying and cover board 31D on board 31A, thereby completing second apparatus 31. At the same time, second apparatus 31 is connected to coupling device 21 in a rotatable way (6) Cover coupling device 21 with covers 32A, 32B, thereby completing the folding cellular phone as shown in FIG. 3.

Figure 5:
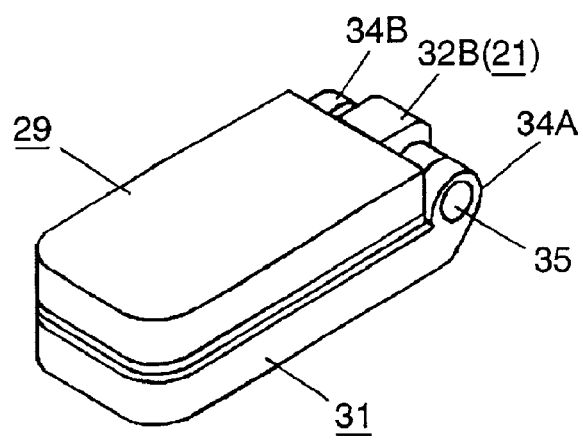
FIG. 5 is a perspective outline drawing of a cellular phone folded.
Figure 6:
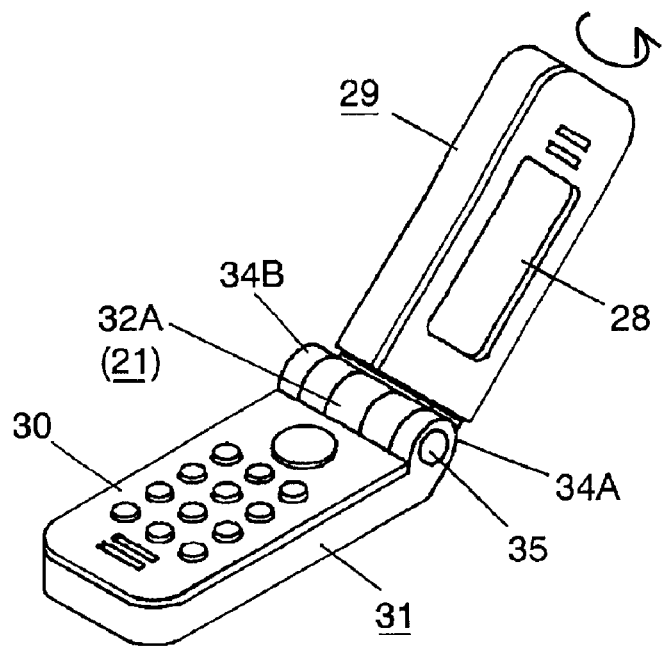
FIG. 6 is a perspective outline drawing of a cellular phone of which first electronic apparatus swivels a right angle.
Figure 7:
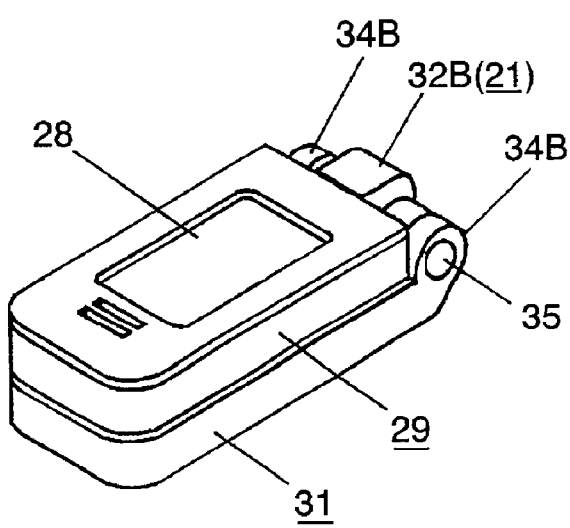
FIG. 7 is a perspective outline drawing of a cellular phone of which first electronic apparatus is turned reversely.

As discussed above, coupling device 21 includes a hinge mechanism formed of main frame 22, pivot pin 35 and others, and a swivel mechanism formed of main frame 22, shaft 25 and others. The hinge mechanism connects first apparatus 29 to second apparatus 31 in a foldable way FIG. 5 shows a cellular phone folded. The swivel mechanism as shown in FIG. 6 holds first apparatus 29 in a swivelable way. FIG. 7 shows a cellular phone of which first apparatus 29 is folded with its face turned up.

Figure 8A:
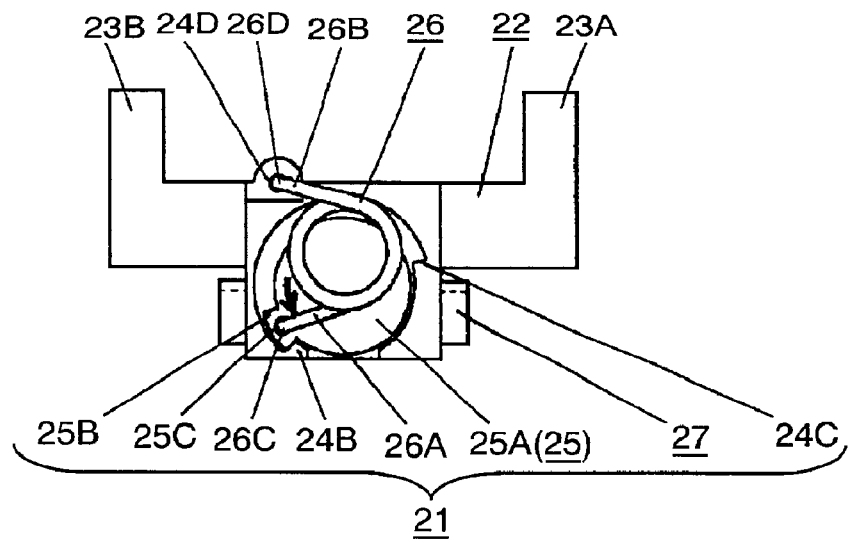
FIG. 8A–FIG. 8C illustrate how a swivel mechanism works in accordance with the first exemplary embodiment.
Figure 8B:
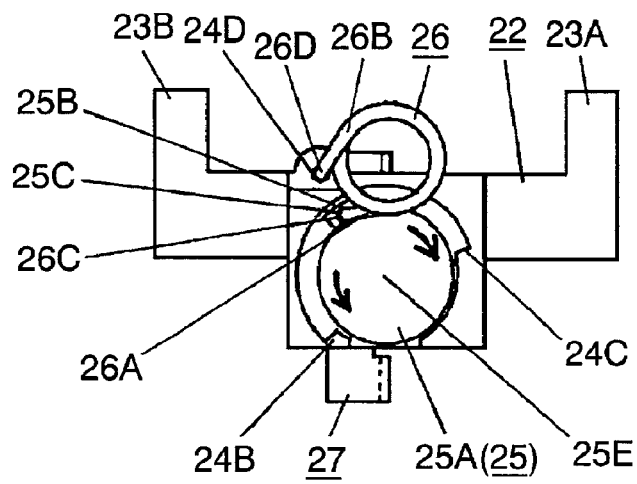
Figure 8C:
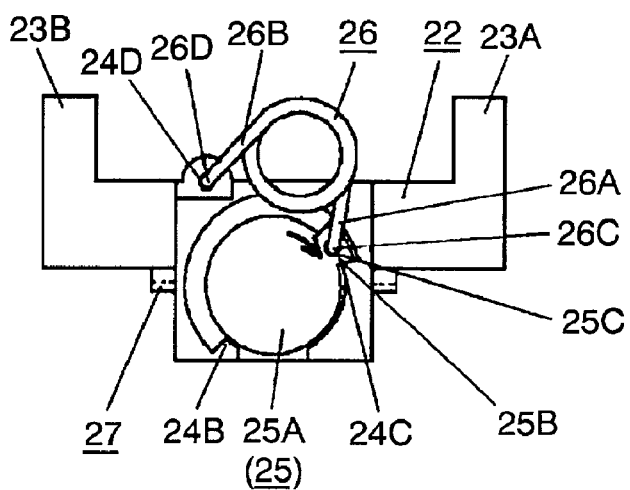

An operation of the swivel mechanism in accordance with the first embodiment is demonstrated with reference to FIG. 8A–FIG. 8C. FIG. 8A shows the swivel mechanism in a normal status (shown in FIG. 3) with its display 28 facing in front. Resilient repulsion of spring 26, of which both ends are inserted into small holes 24D, 25C respectively, energizes the swivel mechanism along the arrow mark such that protrusion 25B is urged to stopper 24B. Then first apparatus 29 (not shown) connected to mounting bracket 27 stops and stays still.

FIG. 8B shows a status of the swivel mechanism when first apparatus 29 is approx. at the center of the swivelable range and perpendicular to second apparatus 31. In other words, first apparatus faces laterally second apparatus 31 as shown in FIG. 6. The centers of small holes 24D, 25C and shaft 25E are aligned, which means that first apparatus 29 is at a neutral position of the resilient repulsion of spring 26. Spring 26 can receive the strongest torque at the neutral position. From the status shown in FIG. 8A, a user starts swiveling first apparatus 29 clockwise, then the resilient repulsion of spring 26 resists the swiveling on the way to the neutral position but assists the swiveling after first apparatus 29 passes the neutral position. If the user takes a hand off first apparatus 29 before it arrives at the neutral position, apparatus 29 is energized to return to stopper 24B. If the user takes a hand off apparatus 29 after it passes the neutral position, apparatus 29 is energized to move to stopper 24C. In either case, first apparatus 29 swivels to either one of the ends, and stops and stays still at the end. Since the neutral position is unstable, first apparatus 29 hardly stops there.

FIG. 8C shows a status of the swivel mechanism when display 28 is faced up, i.e., the cellular phone is doubled back and display 28 shows in front. The resilient repulsion of spring 26 energizes the swivel mechanism along the arrow mark such that protrusion 25B is urged to stopper 24C. First apparatus 29 connected to mounting bracket 27 stops and stays still. In this status, when the user folds the cellular phone, display 28 shows in front as shown in FIG. 7.

Second Exemplary Embodiment

Figure 9A:
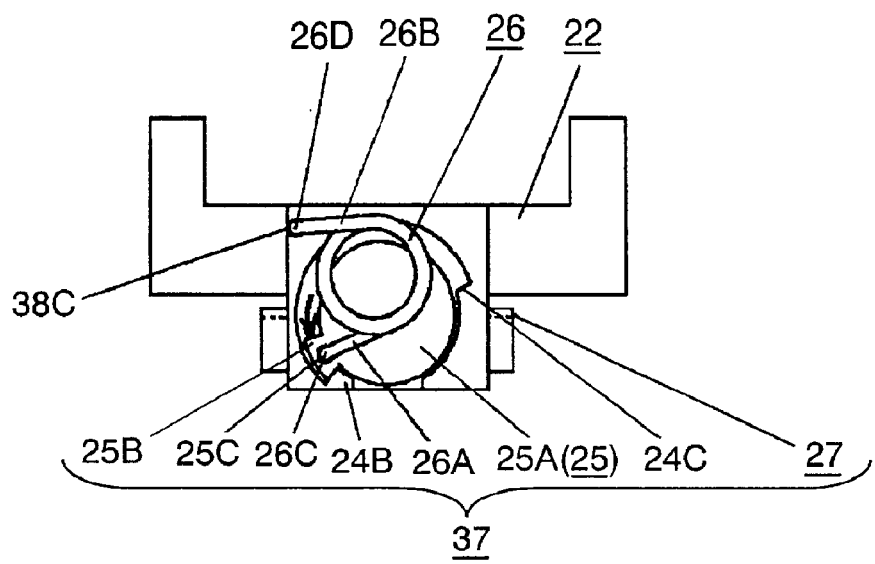
FIG. 9A–FIG. 9C illustrate how a swivel mechanism works in accordance with the second exemplary embodiment.
Figure 9B:
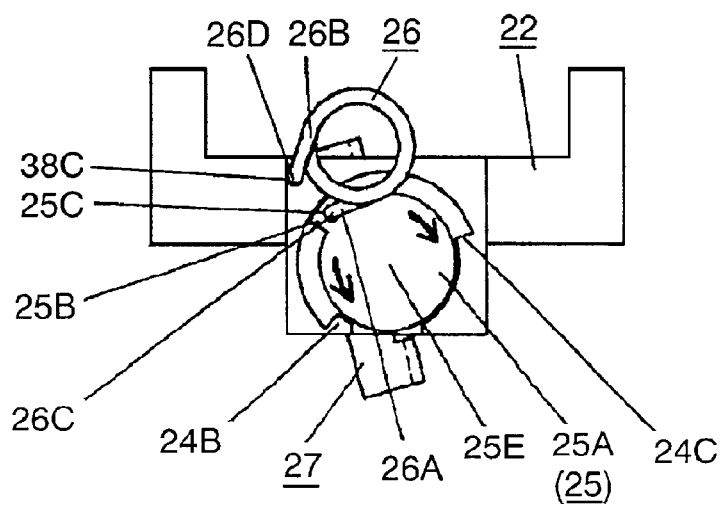
Figure 9C:
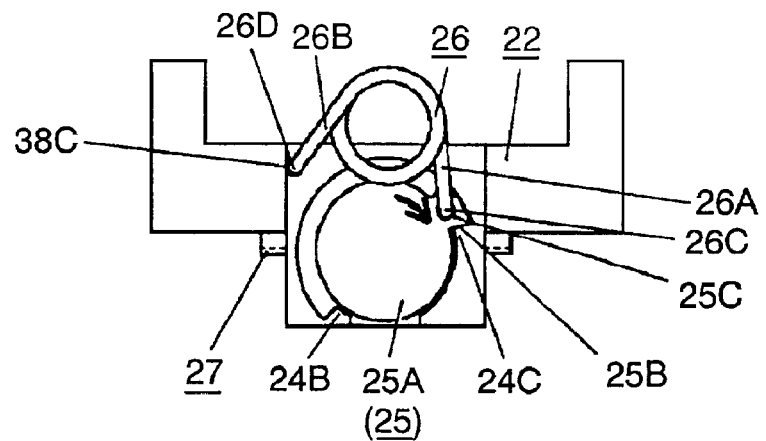

A coupling device in accordance with the second embodiment is demonstrated with reference to FIG. 9A–FIG. 9C. Elements similar to those in the first embodiment have the same reference marks and the descriptions thereof are omitted here. A construction of coupling device 37 of the second embodiment is similar to that of coupling device 29 of the first embodiment. The only difference is that small hole 38C, to which end 26D of spring 26 is inserted, is provided at a different circumferential location than small hole 24D of the first embodiment.

As shown in FIG. 9A–FIG. 9C, small hole 38C is provided on the left side from a middle point between stoppers 24B, 24C. This structure allows the centers of small holes 38C, 25C and center 25E of shaft 25 to be aligned. A neutral position of resilient repulsion of spring 26 is located on the left side from the middle point between stoppers 24B, 24C. Therefore, when first apparatus 29 is at the neutral position, an angle formed by first and second apparatuses 29, 31 can deviate from a right angle. As a result, this structure can reduce damage to the cellular phone when it is folded. Spring 26 receives the strongest torque at the neutral position of the resilient repulsion.

FIG. 9A shows a normal status of the swivel mechanism with its display 28 facing in front, as shown in FIG. 3. Ends 26D, 26C of spring 26 are inserted in small holes 38C, 25C respectively, and the resilient repulsion of this spring 26 energizes the swivel mechanism along the arrow mark such that protrusion 25B is urged to stopper 24B. First apparatus 29 (not shown) connected to mounting bracket 27 stops and stays still.

Figure 10:
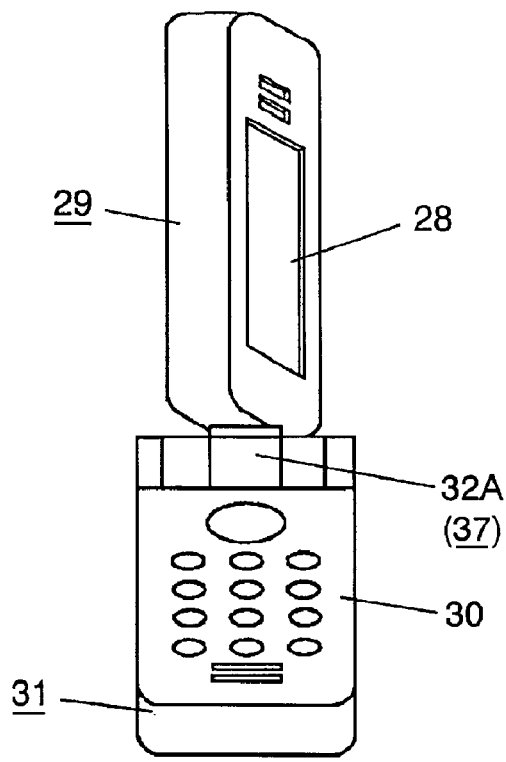
FIG. 10 is a perspective outline drawing of a cellular phone of which first electronic apparatus swivels aslant with respect to a second apparatus.

FIG. 9B shows a status of the swivel mechanism when first apparatus 29 is at the neutral position of the resilient repulsion of spring 26. The neutral position is on the left side from a middle point between stoppers 24B and 24C. First apparatus 29 thus does not face second apparatus 31 at a right angle, but it faces second apparatus 31 in a laterally slanted (aslant) manner as shown in FIG. 10. From the status shown in FIG. 9A, a user starts swiveling first apparatus 29 clockwise, then the resilient repulsion of spring 26 resists the swiveling on the way to the neutral position. However, the repulsion assists the swiveling after first apparatus 29 passes the neutral position, as shown by arrow marks in FIG. 9B.

FIG. 9C shows a status of the swivel mechanism when display 28 is faced up, i.e., the cellular phone is doubled back and display 28 shows in front. The resilient repulsion of spring 26 energizes the swivel mechanism along the arrow mark such that protrusion 26B is urged to stopper 24C. First apparatus 29 connected to mounting bracket 27 stops and stays still. In this status, when the user folds the cellular phone, display 28 shows in front as shown in FIG. 7.

Because the neutral position is unstable, first apparatus 29 hardly stops at the neutral position shown in FIG. 9B. However, it stops there sometime anyway. Even if first apparatus 29 stops at the neutral position, first apparatus 29 does not face second apparatus 31 at a right angle, but it escapes from a place where the right angle is formed with second apparatus 31. Therefore, if first apparatus 29 is overlaid onto second apparatus 31 by folding, and a corner of apparatus 29 hits operating board 30 of apparatus 31, the corner slips on the operating board, and apparatus 29 deviates from the neutral position. Then spring 26 energizes first apparatus 29 to swivel to either one of the stoppers nearer to the slipped position. Therefore, first apparatus 29 or second apparatus 31 is scarcely damaged.

Third Exemplary Embodiment

Figure 11:
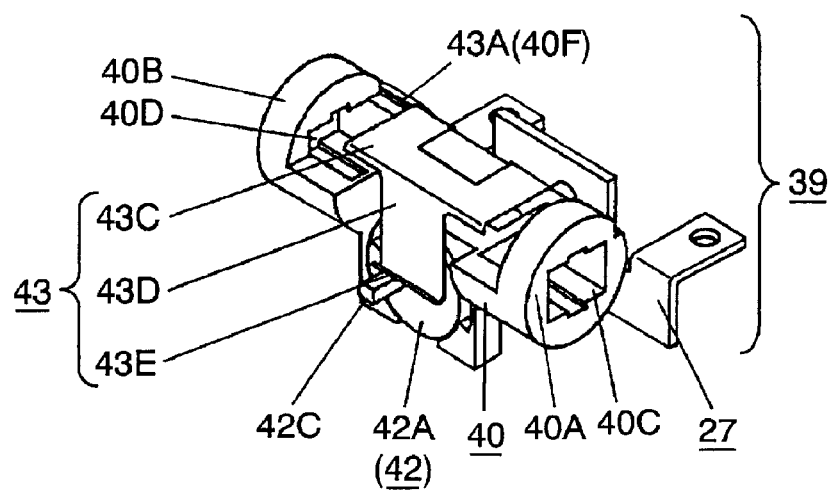
FIG. 11 is a perspective outline drawing of a coupling device in accordance with a third exemplary embodiment of the present invention.
Figure 12:
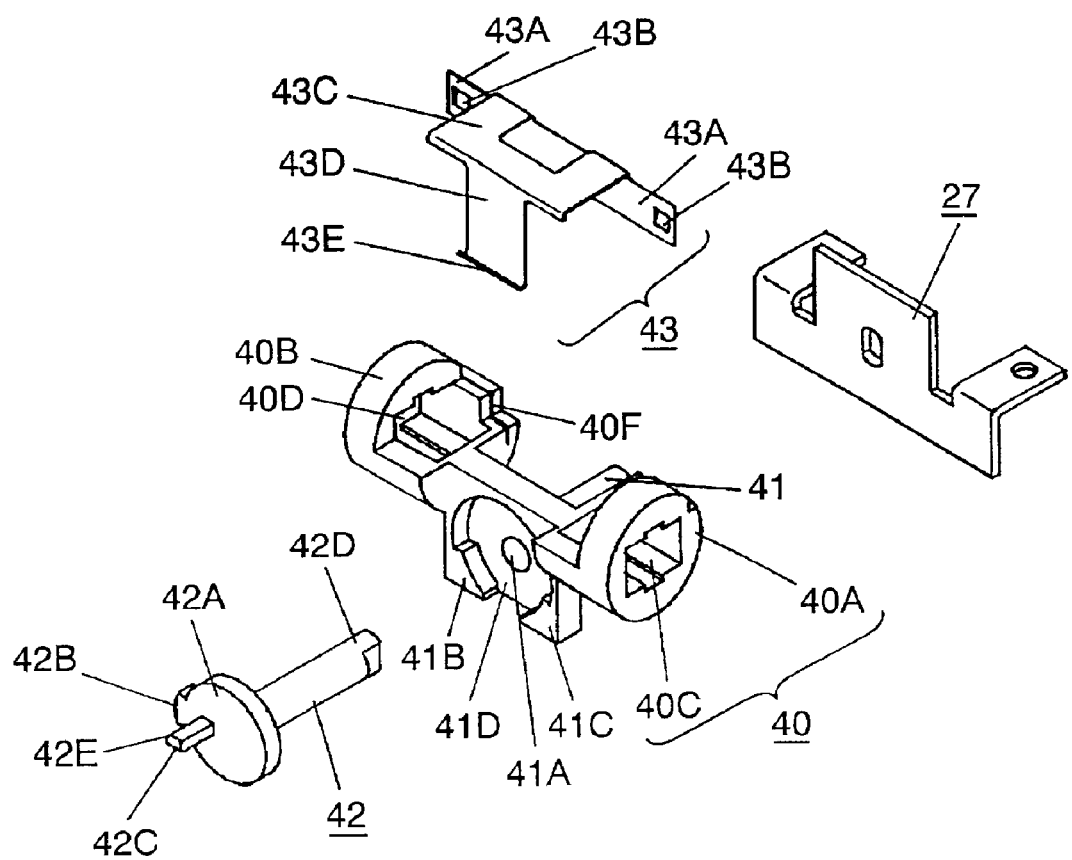
FIG. 12 shows a perspective exploded view of the coupling device shown in FIG. 11.

A coupling device in accordance with the third embodiment is demonstrated hereinafter. Elements similar to those in the previous embodiments have the same reference marks and the descriptions thereof are omitted here. FIG. 11 is a perspective outline drawing of the coupling device, and FIG. 12 shows a perspective exploded view of the same coupling device. Main frame 40 of coupling device 39 includes flanges 40A, 40B at respective ends and cylinder 41 at the center. Flanges 40A, 40B have square holes 40C, 40D respectively. Cylinder 41 has a through-hole 41A running perpendicular to an axis line extending between the centers of square holes 40C, 40D. Swiveling shaft 42 fits into hole 41A in a swivelable way. Flange 42A at a first end of shaft 42 has protrusion 42B on its rim. Two stoppers 41B, 41C are provided to circular recess 41D. Protrusion 42B and stoppers 41B, 41C regulate a swivelable range to within 180°. Shaft 42 has protrusion 42C on an end face of flange 42A at a place nearer to protrusion 42B. Protrusion 42C has side face 42E which bows outward. If there is no problem in strength, protrusion 42C may have a circular or a semi-circular sectional shape. Mounting bracket 27 is fixed to a second end, which is a non-circular section 42D, of shaft 42.

A pair of slits 40E (not shown), 40F are disposed inside flanges 40A, 40B respectively. Holding section 43A of spring 43 made from elastic thin metal plate is press-fitted downward into slits 40E, 40F, and held in the slits. Claws 43B prevent holding section 43A from coming off. Linear section 43E of spring 43 urges elastically protrusion 42C of shaft 42 with a given pressure.

A method of assembling a folding cellular phone, which uses coupling device 39 discussed above, is the same as demonstrated in the first embodiment. The description of the assembling method is thus omitted here.

Figure 13A:
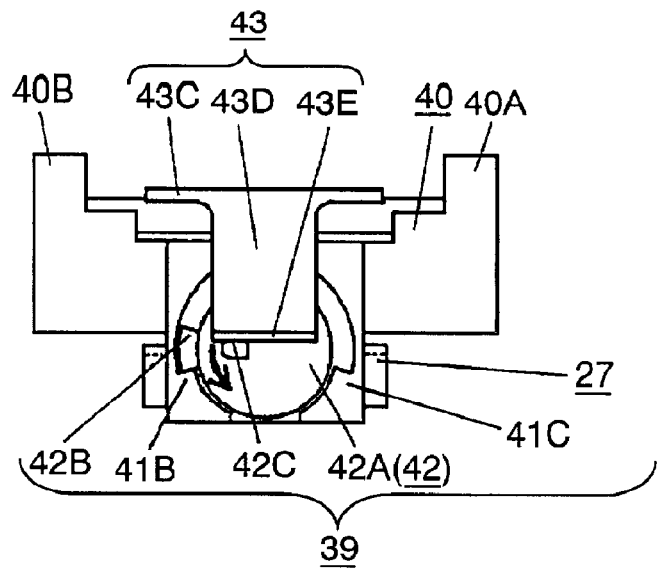
FIG. 13A–FIG. 13C illustrate how a swivel mechanism works in accordance with the third exemplary embodiment.
Figure 13B:
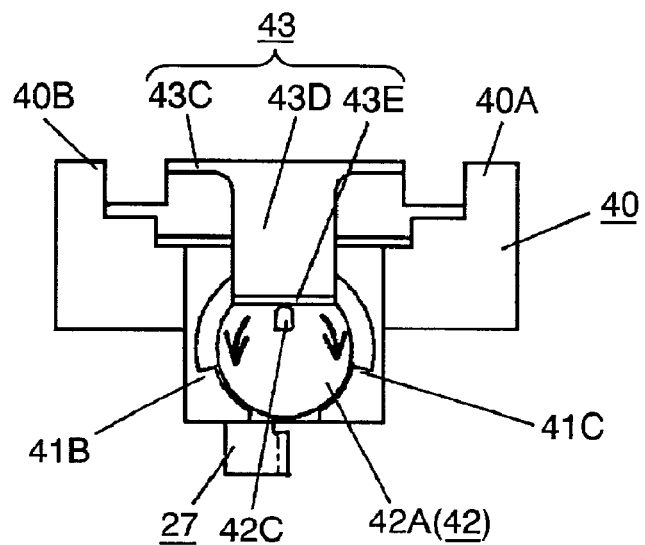
Figure 13C:
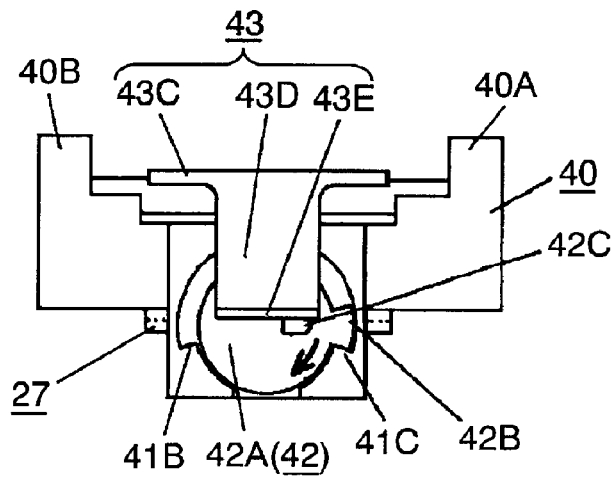

An operation of a swivel mechanism in accordance with the third embodiment is demonstrated with reference to FIG. 13A–FIG. 13C. FIG. 13A illustrates a normal status (as shown in FIG. 3) of the swivel mechanism, i.e., display 28 faces in front. Linear section 43E of spring 43 urges elastically a side face of protrusion 42C. Resilient repulsion of spring 43 energizes the swivel mechanism along the arrow mark such that protrusion 42B is urged to stopper 41B. First apparatus 29 (not shown) connected to mounting bracket 27 stops and stays still.

FIG. 13B shows a status of the swivel mechanism when first apparatus 29 is approx. at the center of the swivelable range and perpendicular to second apparatus 31. In other words, first apparatus faces laterally second apparatus 31 as shown in FIG. 6. Linear section 43E of spring 43 comes in contact with a top of side face 42E, bowed outward, of protrusion 42C. This means that first apparatus 29 is at a neutral position of the resilient repulsion of spring 43. Spring 43 can receive the strongest torque (i.e. attains the greatest restoring force) at the neutral position. From the status shown in FIG. 13A, a user starts swiveling first apparatus 29 clockwise, then the resilient repulsion of spring 43 resists the swiveling on the way to the neutral position but assists the swiveling after first apparatus 29 passes the neutral position. If the user takes a hand off first apparatus 29 before it arrives at the neutral position, apparatus 29 is energized to return to stopper 41B. If the user takes a hand off apparatus 29 after it passes the neutral position, apparatus 29 is energized to move to stopper 41C. In either case, first apparatus 29 swivels to either one of the ends, and stops and stays still at the end. Since the neutral position is unstable, first apparatus 29 hardly stops there.

FIG. 13C shows a status of the swivel mechanism when display 28 is faced up, i.e., the cellular phone is doubled back and display 28 shows in front. The resilient repulsion of spring 43 energizes the swivel mechanism along the arrow mark such that protrusion 42B is urged to stopper 41C. First apparatus 29 connected to mounting bracket 27 stops and stays still. In this status, when the user folds the cellular phone, display 28 shows in front as shown in FIG. 7.

Fourth Exemplary Embodiment

A coupling device in accordance with the fourth embodiment is described with reference to FIG. 14A–FIG. 14C. Elements similar to those in the previous embodiments have the same reference marks and the descriptions thereof are omitted here. A structure of coupling device 44 in accordance with the fourth embodiment is similar to coupling device 39 used in the third embodiment However, locations of stoppers 41B, 41C and an angle formed by protrusions 42B, 42C are different from those in the third embodiment. Protrusion 42B deviates in circumferential position from protrusion 42C by a given angle.

This structure allows first apparatus 29, being at a neutral position of resilient repulsion of spring 43, to escape from a right angle with respect to second apparatus 31. Thus damage, incurred when a cellular phone is folded, can be reduced. Spring 43 receives the strongest torque at the neutral position of the resilient repulsion.

Figure 14A:
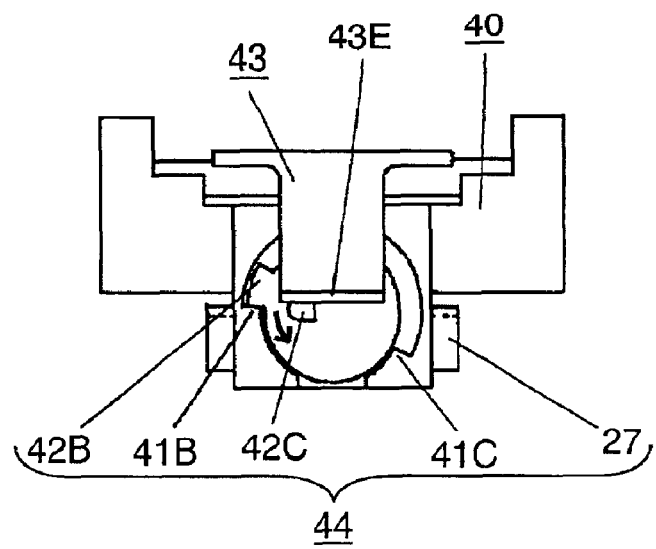
FIG. 14A–FIG. 14C illustrate how a swivel mechanism works in accordance with a fourth exemplary embodiment.

FIG. 14A illustrates a normal status (as shown in FIG. 3) of the swivel mechanism, i.e., display 28 faces in front. Linear section 43E of spring 43 urges elastically a side face of protrusion 42C. Resilient repulsion of spring 43 energizes the swivel mechanism along the arrow mark such that protrusion 42B is urged to stopper 41B. First apparatus 29 (not shown) connected to mounting bracket 27 stops and stays still.

Figure 14B:
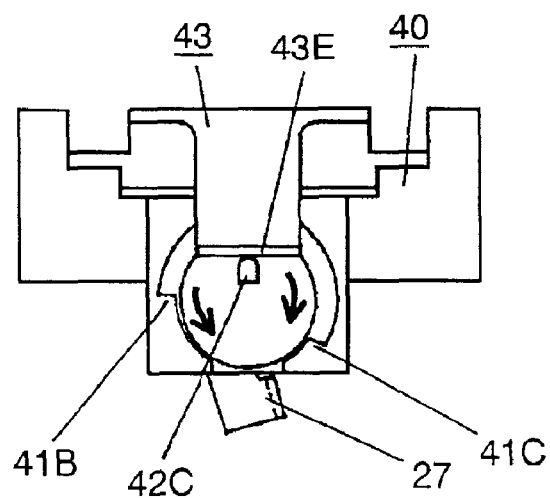

FIG. 14B shows a status of the swivel mechanism when first apparatus 29 is at the neutral position. Linear section 43E of spring 43 comes in contact with a top of side face 42E, bowing outward, of protrusion 42C. This means that first apparatus 29 is at the neutral position of the resilient repulsion of spring 43. Spring 43 can receive the strongest torque at its neutral position. In this status, first apparatus 29 does not face second apparatus 31 at a right angle, but it faces second apparatus 31 in a laterally slanted (aslant) manner as shown in FIG. 10. From the status shown in FIG. 14A, a user starts swiveling first apparatus 29 clockwise, then the resilient repulsion of spring 43 resists the swiveling on the way to the neutral position but assists the swiveling after first apparatus 29 passes the neutral position. An angle, traveled by first apparatus 29 for swiveling up to the neutral position, is smaller than 90°.

Figure 14C:
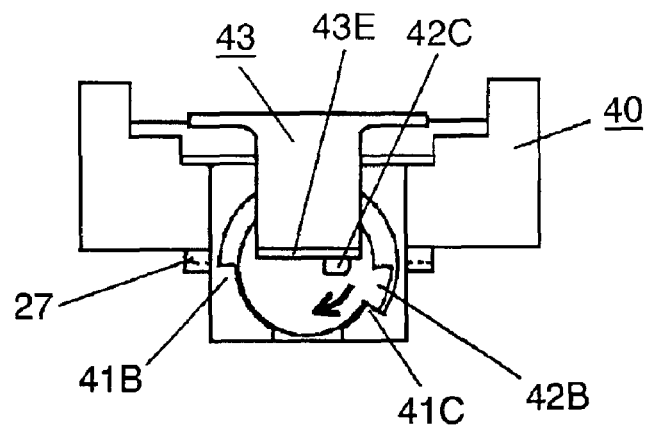

FIG. 14C shows a status of the swivel mechanism when display 28 is faced up, i.e., the cellular phone is doubled back and display 28 shows in front. The resilient repulsion of spring 43 energizes the swivel mechanism along the arrow mark such that protrusion 42B is urged to stopper 41C. First apparatus 29 connected to mounting bracket 27 stops and stays still. In this status, when the user folds the cellular phone, display 28 shows in front as shown in FIG. 7.

Since the neutral position is unstable, first apparatus 29 hardly stops at the neutral position shown in FIG. 14B. However, it stops there sometimes anyway. Even if first apparatus 29 stops at the neutral position, first apparatus 29 does not face second apparatus 31 at a right angle, but it escapes from a place where the right angle is formed with second apparatus 31. Therefore, if first apparatus 29 is overlaid onto second apparatus 31 by folding, and a corner of apparatus 29 hits operating board 30 of apparatus 31, the corner slips on the operating board, and apparatus 29 deviates from the neutral position. Then spring 26 energizes first apparatus 29 to swivel to either one of the stoppers nearer to the slipped position. Therefore, first apparatus 29 or second apparatus 31 is scarcely damaged.

In the description above, the neutral position is nearer to stopper 45B than to the middle point of the swivelable range of first apparatus 29. However, the neutral position can be located nearer to another stopper 45C than to the middle point of the swivelable range of first apparatus 29 by reversing a direction of the angle deviation between protrusion 42B, 42C.

Fifth Exemplary Embodiment

Figure 15:
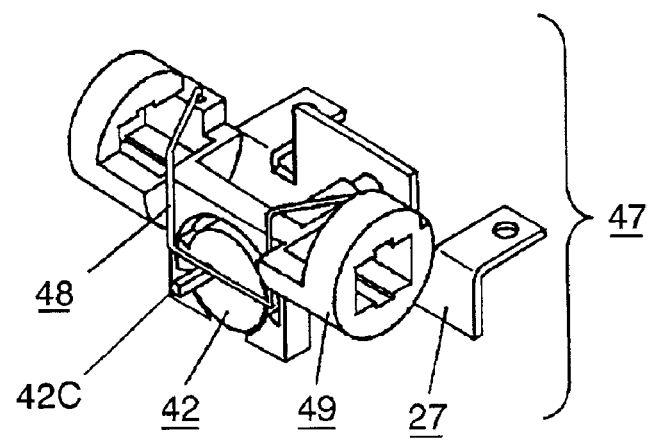
FIG. 15 is a perspective outline drawing of a coupling device in accordance with a fifth exemplary embodiment of the present invention.
Figure 16:
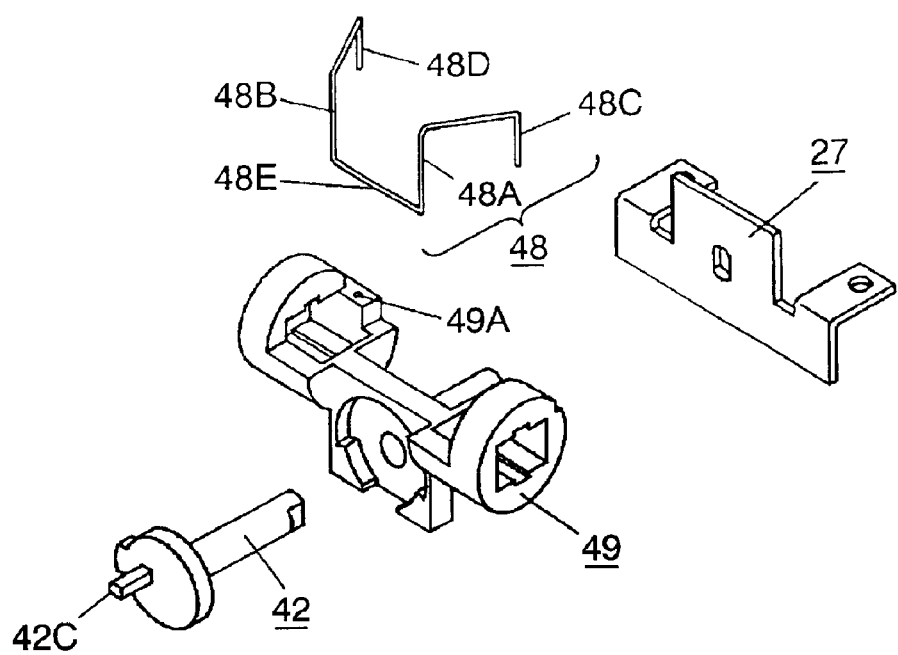
FIG. 16 shows a perspective exploded view of the coupling device shown in FIG. 15.
Figure 17:
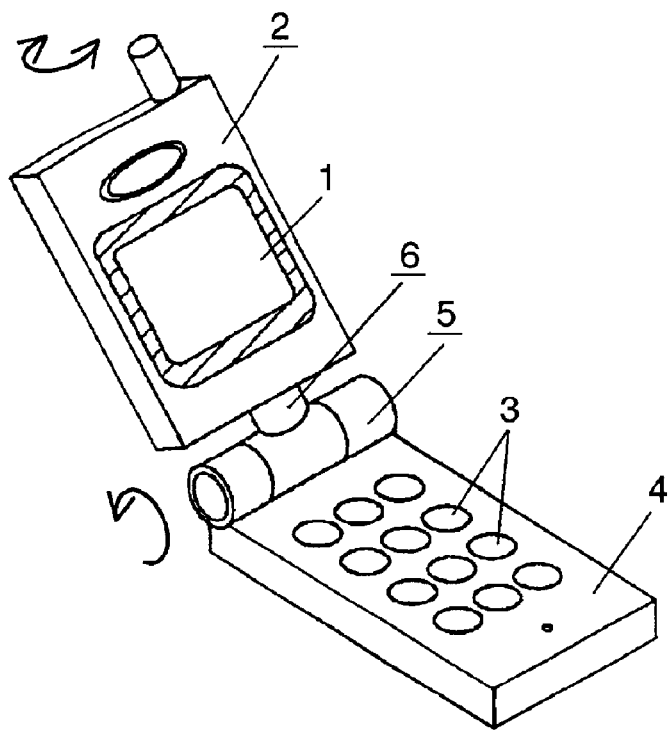
FIG. 17 is a perspective outline drawing of a folding cellular phone using a conventional coupling device.
Figure 18:
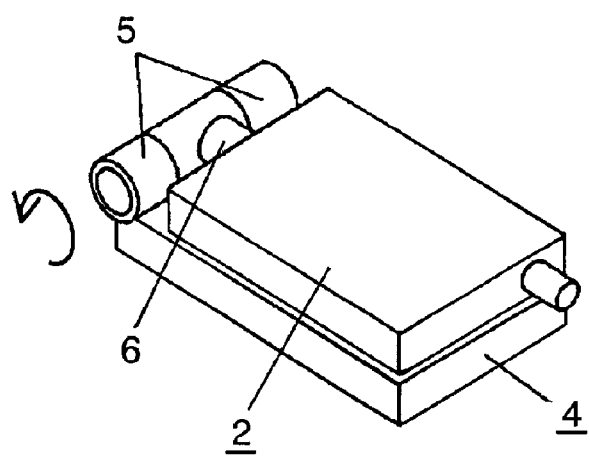
FIG. 18 is a perspective outline drawing of a conventional cellular phone folded.
Figure 19:
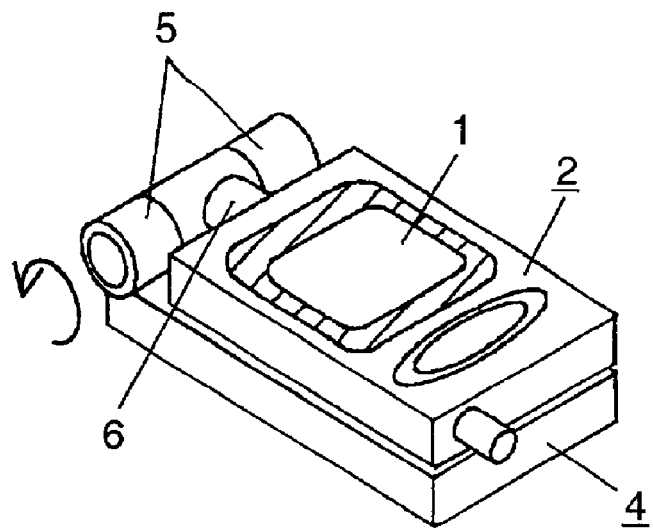
FIG. 19 is a perspective outline drawing of a conventional cellular phone of which first electronic apparatus is doubled back reversely to what is shown in FIG. 18.
Figure 20:
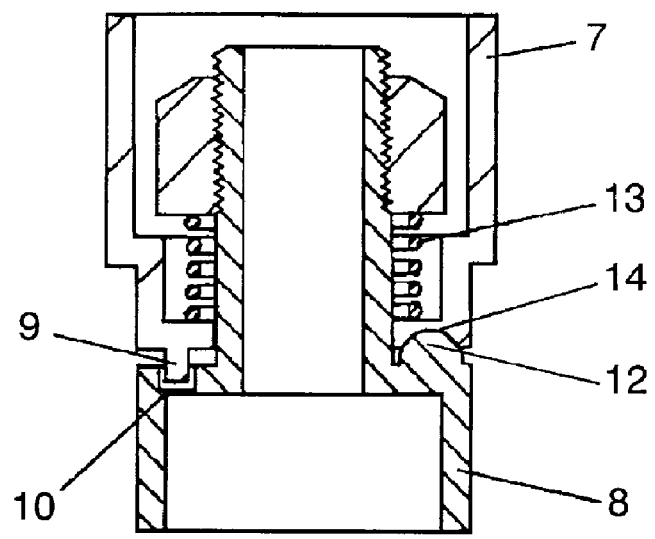
FIG. 20 shows a sectional view of a conventional swiveling mechanism.
Figure 21A:
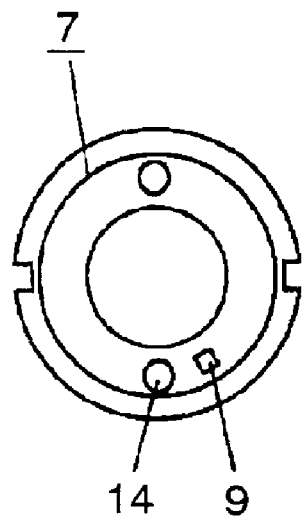
FIG. 21A and FIG. 21B illustrate each end face of cylindrical members of the conventional swiveling mechanism.
Figure 21B:
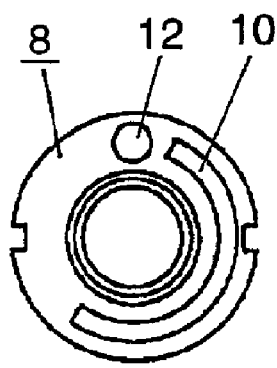

A coupling device in accordance with the fifth embodiment is demonstrated hereinafter. Elements similar to those in the previous embodiments have the same reference marks and the descriptions thereof are omitted here. FIG. 15 is a perspective outline drawing of the coupling device in accordance with the fifth embodiment, and FIG. 16 shows a perspective exploded view of the same coupling device. Coupling device 47 uses spring 48 formed of metal wire. Spring 48 is made of resilient metal round-wire, such as piano-wire, having undergone a bending process. Tips 48C, 48D of spring 48 are press-fitted and fixed into supporting holes 49A, 49B (not shown) provided in main frame 49, and linear section 48E of spring 48 is urged to a side ace of protrusion 42C.

Other parts and an operation of coupling device 47 are similar to those described in the third embodiment with reference to FIG. 11–FIG. 13C. The descriptions thereof are thus omitted here.

What is claimed is:

1. A coupling device for a folding electronic apparatus, said coupling device for coupling a first electronic apparatus, having first and second faces facing in opposite directions away from each other, to a second electronic apparatus of the folding electronic apparatus, said device comprising:

a hinge mechanism arranged to allow pivoting of the first electronic apparatus relative to the second electronic apparatus about a hinge axis for unfolding the folding electronic apparatus into the first electronic apparatus and the second electronic apparatus, and folding the first electronic apparatus and the second electronic apparatus into the folding electronic apparatus;

a swivel mechanism mounted to said hinge mechanism for retaining the first electronic apparatus in a swivelable way, within a predetermined swivelable range having two ends, such that the first electronic apparatus and the second electronic apparatus can be selectively folded into the folding electronic apparatus in either of a first position and a second position, the first position being with the first electronic apparatus occupying a predetermined location on the second electronic apparatus and having the first face of the first electronic apparatus facing toward the second electronic apparatus, and the second position being with the first electronic apparatus occupying said predetermined location on the second electronic apparatus and having the first face of the first electronic apparatus facing away from the second electronic apparatus; and a torsion spring for energizing said swivel mechanism, wherein said torsion spring is mounted to said swivel mechanism such that said torsion spring has a large torsional restoring force when the first electronic apparatus is at a middle point in the swivelable range and the restoring force of the spring lowers as the first electronic apparatus approaches either of the two ends of the swivelable range, wherein, upon said torsion spring being released from the middle point of the swivelable range, resilient torsional repulsion of said torsion spring energizes said swivel mechanism such that the first electronic apparatus swivels toward one of the ends of the swivelable range, and wherein said swivel mechanism is arranged for swiveling the first electronic apparatus relative to the second electronic apparatus about a swivel axis that is generally perpendicular to said hinge axis, and for selectively folding the first electronic apparatus so that said first face of the first electronic apparatus is turned outwardly, away from said second electronic apparatus or so that said first face of the first electronic apparatus is turned inwardly, toward said second electronic apparatus.

2. The coupling device of claim 1, wherein said swivel mechanism is arranged such that the predetermined swivelable range for swiveling of the first electronic apparatus is 180°.

3. The coupling device of claim 1, wherein said swivel mechanism includes a swiveling shaft;

wherein said torsion spring for energizing said swivel mechanism is a torsion coil spring, and a first end of the torsion coil spring is retained at a movable point of the swiveling shaft, and a second end is retained at a static point of said coupling device; and wherein both the ends of the torsion coil spring and a center of the swiveling shaft are arranged so as to be aligned when the first electronic apparatus swivels by a predetermined angle.

4. The coupling device of claim 3, wherein both the ends of the torsion coil spring and the center of the swiveling shaft are arranged so as to be aligned when the first electronic apparatus is at a middle point between a half-way point of the swivelable range and one of the two ends of the swivelable range.

5. The coupling device of claim 1, wherein said swivel mechanism includes a swiveling shaft which has a protrusion on an end portion of the shaft;

wherein said torsion spring for energizing said swiveling mechanism includes a linear section at a first end, the linear section elastically urging the protrusion of the shaft, and a second end of said torsion spring is retained stationary by said coupling device.

6. The coupling device of claim 5, wherein said torsion spring is made from elastic metal thin plate which has undergone punching and then bending process.

7. The coupling device of claim 5, wherein said torsion spring is made of resilient metal wire which has undergone bending process.

8. The coupling device of claim 5, wherein the protrusion provided on the end portion of the shaft is provided at an end face of the end portion of the shaft and includes a bowed side face to which the linear section of said torsion spring is elastically urged.

9. The coupling device of claim 5, wherein the protrusion on the end portion of the shaft is provided at a predetermined place such that said torsion spring has a largest restoring force when the first electronic apparatus is at a middle point between a half-way point of the swivelable range and one of the two ends of the swivelable range.

10. A folding electronic apparatus which connects a first electronic apparatus to a second electronic apparatus with the coupling device as defined in claim 1.

11. A coupling device for coupling a first electronic apparatus, having first and second faces facing in opposite directions away from each other, to a second electronic apparatus, having first and second faces facing in opposite directions away from each other, to form a folding electronic apparatus, said coupling device comprising:

a hinge mechanism for unfolding and folding the folding electronic apparatus by pivoting the first electronic apparatus relative to the second electronic apparatus between a closed position in which said first electronic apparatus is folded against the first face of the second electronic apparatus, and an open position in which the first electronic apparatus is unfolded away from the first face of the second electronic apparatus;

a swivel mechanism mounted to said hinge mechanism for retaining the first electronic apparatus in a swivelable way relative to the second electronic apparatus, for swiveling within a predetermined swivelable range having two ends, such that the folding electronic apparatus can selectively be manipulated into both first and second closed orientations in which the first electronic apparatus occupies the same position against the first face of the second electronic apparatus;

wherein, in said first closed orientation, said folding electronic apparatus is folded into said closed position with the first electronic apparatus so that the first face of the first electronic apparatus faces outwardly, away from the first face of the second electronic apparatus;

wherein, in said second closed orientation, said folding electronic apparatus is folded into said closed position with the first electronic apparatus oriented so that the first face of the first electronic apparatus faces inwardly, toward the first face of the second electronic apparatus, a torsion spring for energizing said swivel mechanism;

wherein said torsion spring is mounted to said swivel mechanism such that said torsion spring has a large torsional restoring force when the first electronic apparatus is at a middle point in the swivelable range and the torsional restoring force of the spring lowers as the first electronic apparatus approaches either of the two ends of the swivelable range; and wherein, upon said torsion spring being released from the middle point of the swivelable range, torsional resilient repulsion of said torsion spring energizes said swivel mechanism such that the first electronic apparatus swivels toward one of the ends of the swivelable range.

12. The coupling device of claim 11, wherein said swivel mechanism is arranged such that the predetermined swivelable range for swiveling of the first electronic apparatus is 180°.

13. The coupling device of claim 11, wherein said swivel mechanism includes a swiveling shaft;

wherein said torsion spring for energizing said swivel mechanism is a torsion coil spring, and a first end of the torsion coil spring is retained at a movable point of the swiveling shaft, and a second end is retained at a static point of said coupling device; and wherein both the ends of the torsion coil spring and a center of the swiveling shaft are arranged so as to be aligned when the first electronic apparatus swivels by a predetermined angle.

14. The coupling device of claim 13, wherein both the ends of the torsion coil spring and the center of the swiveling shaft are arranged so as to be aligned when the first electronic apparatus is at a middle point between a half-way point of the swivelable range and one of the two ends of the swivelable range.

15. The coupling device of claim 11, wherein said swivel mechanism includes a swiveling shaft which has a protrusion on an end portion of the shaft;

wherein said torsion spring for energizing said swiveling mechanism includes a linear section at a first end, the linear section elastically urging the protrusion of the shaft, and a second end of said spring is retained stationary by said coupling device.

16. The coupling device of claim 15, wherein said torsion spring is made from elastic metal thin plate which has undergone punching and then bending process.

17. The coupling device of claim 15, wherein said torsion spring is made of resilient metal wire which has undergone bending process.

18. The coupling device of claim 15, wherein the protrusion provided on the end portion of the shaft is provided at an end face of the end portion of the shaft and includes a bowed side face to which the linear section of said torsion spring is elastically urged.

19. The coupling device of claim 15, wherein the protrusion on the end portion of the shaft is provided at a predetermined place such that said spring has a largest restoring force when the first electronic apparatus is at a middle point between a half-way point of the swivelable range and one of the two ends of the swivelable range.

20. A folding electronic apparatus which connects a first electronic apparatus to a second electronic apparatus with the coupling device as defined in claim 11.

* * * * *